(12) United States Patent
Curtis et al.

(10) Patent No.: US 6,233,865 B1
(45) Date of Patent: May 22, 2001

(54) CONFORMABLE TERMITE BAIT CONTAINER FOR WALLS AND CORNERS

(76) Inventors: David H. Curtis, 172 Lonetown Rd.; Michael R. Latronica, 177 Lonetown Rd., both of Redding, CT (US) 06896

( * ) Notice: Subject to any disclaimer, the term of this patent is extended or adjusted under 35 U.S.C. 154(b) by 0 days.

(21) Appl. No.: 09/387,958

(22) Filed: Sep. 1, 1999

(51) Int. Cl.[7] ................................................. A01M 1/20
(52) U.S. Cl. ......................................................... 43/131
(58) Field of Search ................................ 43/132.1, 131, 43/124

(56) References Cited

U.S. PATENT DOCUMENTS

| | | |
|---|---|---|
| 2,101,988 | 12/1937 | Epstein . |
| 3,304,646 | 2/1967 | Staley . |
| 4,804,142 * | 2/1989 | Riley ........................................ 43/131 |
| 4,866,877 * | 9/1989 | Barak ..................................... 43/132.1 |
| 4,921,696 | 5/1990 | Vander Meer et al. . |
| 4,959,924 * | 10/1990 | Martin ................................... 43/132.1 |
| 5,022,180 * | 6/1991 | Albanese ................................. 43/131 |
| 5,406,744 * | 4/1995 | Schneider et al. ....................... 43/131 |
| 5,502,919 * | 4/1996 | Ciarletta ................................. 43/131 |
| 5,555,672 | 9/1996 | Thorne et al. . |
| 5,609,879 | 3/1997 | Myles . |
| 5,778,596 | 7/1998 | Henderson et al. . |

* cited by examiner

Primary Examiner—Thomas Price
(74) Attorney, Agent, or Firm—Clifford L. Tager

(57) ABSTRACT

The present invention is directed to a conformable termite bait container capable of being located either against a first substantially planar surface or against a corner defined by the intersection of a second and a third substantially planar surfaces. In a preferred embodiment, the conformable termite bait container comprises a housing having a front wall, a back wall and side walls operatively connected between the front wall and the back wall, where the front, back and side walls form an interior cavity capable of storing insect bait. A plurality of openings are located on the housing to allow termites to enter and exit the housing and access the insect bait located therewithin. The back wall of the housing is capable of being located against the first substantially planar surface, and in the alternative, the back wall and front wall are capable of being bent substantially in the shape of the corner to allow a first and a second portion of the back wall to be located against the second and the third substantially planar surfaces, respectively, defining the corner. The conformable termite bait container preferably further comprises a back hinge located on the back wall to facilitate the bending of the back wall, and a front hinge located on the front wall to facilitate the bending of the front wall.

23 Claims, 5 Drawing Sheets

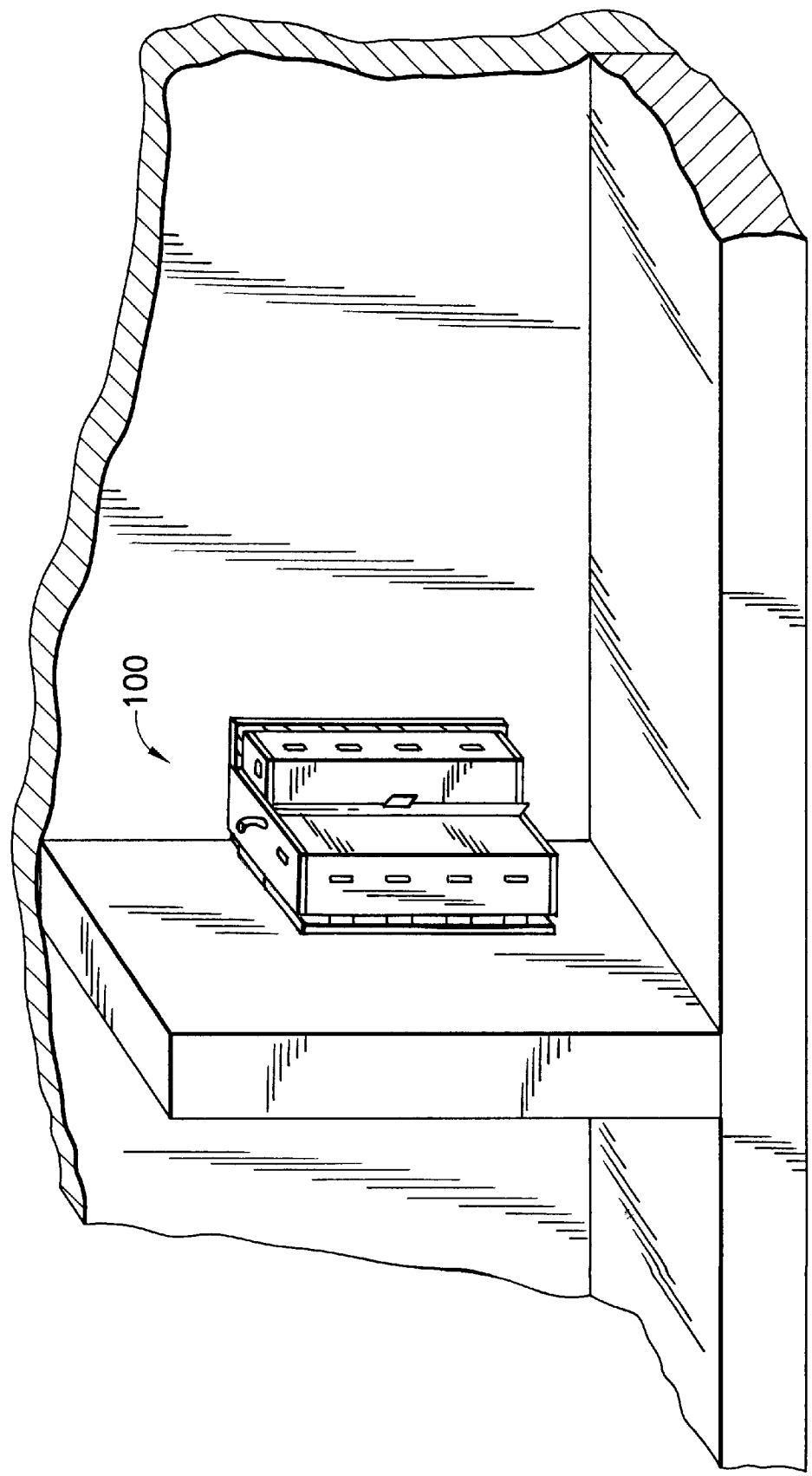

CONFORMABLE TERMITE BAIT CONTAINER FOR WALLS AND CORNERS

BACKGROUND OF THE INVENTION

1. Technical Field

The present invention is directed to an insect bait container. More particularly, the present invention is directed to a termite bait container capable of being located either against a flat surface, such as a wall, or in a corner.

2. Background Information

Termite bait containers that are capable of being located against a wall are well known in the art. Such containers typically comprise a rectangular housing having a back, front, opposing side walls, a top and bottom walls. Termite bait, which is typically termite-ingestible material impregnated with poison, is located within the housing.

The back of the housing is typically attached to a wall in the path of the termites. The termites enter the termite bait container via a plurality of holes located in the side, top and bottom walls of the housing, and ingest the termite bait on their way through the housing. The bait is carried back to the termite nest, where it is distributed and used by the termites for food consumption. Once the poison has been carried back to the termite nest, the poison's toxicity begins to exterminate the termites.

Such prior art termite bait containers are typically suitable for placement against a flat surface and are not effectively disposed in a corner defined by the intersection of two planar surfaces, since only the surface covered by the back wall of the container is adequately covered.

As a result, even if such prior art termite bait containers are located against a corner, only one surface of the corner could effectively be in the termite path, i.e., the surface covered by the back wall of the container.

Accordingly, there is a need for a termite bait container which is capable of being disposed in a corner.

SUMMARY OF THE INVENTION

The present invention is directed to a conformable termite bait container capable of being located either against a first substantially planar surface or against a corner defined by the intersection of a second and a third substantially planar surfaces.

In a preferred embodiment of the present invention, the conformable termite bait container comprises a housing having a front wall, a back wall and side walls operatively connected between the front wall and the back wall, where the front, back and side walls form an interior cavity capable of storing insect bait. A plurality of openings are located on the housing to allow termites to enter and exit the housing and access the insect bait located therewithin.

The back wall of the housing is capable of being located against the first substantially planar surface, and in the alternative, the back wall and front wall are capable of being bent substantially in the shape of the corner to allow a first and a second portion of the back wall to be located against the second and the third substantially planar surfaces, respectively, defining the corner.

The conformable termite bait container preferably further comprises a back hinge located on the back wall to facilitate the bending of the back wall, and a front hinge located on the front wall to facilitate the bending of the front wall.

The back hinge preferably comprises a structurally-weakened area defining a pivot axis, the structurally-weakened area operatively dividing the back wall into the first portion and the second portion, wherein the first and second portions of the back wall are capable of being bent about the pivot axis, thereby allowing the first and the second portions of the back wall to be located against the second and the third substantially planar surfaces, respectively, defining the corner.

The structurally-weakened area of the back hinge preferably consists of an indent, a plurality of perforations, a groove and/or a channel.

The front hinge preferably comprises a first structurally-weakened area located on the front wall and defining a first pivot axis, the first structurally-weakened area operatively dividing the front wall into a first front portion and a second front portion, a second structurally-weakened area located on the first front portion and defining a second pivot axis, the second structurally-weakened area operatively dividing the first front portion into a first inner portion, located between the first and second pivot axes, and a first outer portion, and a third structurally-weakened area located on the second front portion and defining a third pivot axis, the third structurally-weakened area operatively dividing the second front portion into a second inner portion, located between the first and third pivot axes, and a second outer portion.

The bending of the back wall results in the bending of the first inner portion and second inner portion about the first pivot axis, the bending of the first outer portion and first inner portion about the second pivot axis, and the bending of the second outer portion and second inner portion about the third pivot axis.

The first, second and third structurally-weakened areas of the front hinge preferably consist of an indent, a plurality of perforations, a groove and/or a channel.

A pull tab is optionally located on the front wall substantially in juxtaposition with the first pivot axis. The pull tab is capable of having a force exerted thereon to force the first and second inner portions of the front wall to move away from the back wall, thereby facilitating the bending of the first and second inner portions of the front wall about the first pivot axis.

The back wall and front wall each comprise a plurality of terminal ends, two opposite ends of which are defined as top and bottom. The container optionally comprises a first top segment operatively connected to the top of a first portion of the front wall and a second top segment operatively connected to the top of a second portion of the front wall, wherein a portion of first top segment overlaps a portion of the second top segment, wherein the first and second top segments are positioned substantially perpendicular to the front wall, and wherein the bending of the back wall results in the translocation of the first top segment, relative to the second top segment.

Similarly, the container optionally comprises a first bottom segment operatively connected to the bottom of a third portion of the front wall and a second bottom segment operatively connected to the bottom of a fourth portion of the front wall, wherein a portion of first bottom segment overlaps a portion of the second bottom segment, wherein the first and second bottom segments are positioned substantially perpendicular to the front wall, and wherein the bending of the back wall results in the translocation of the first bottom segment, relative to the second bottom segment.

A guidance slot is optionally located in the first top segment, and a guidance pin is optionally located on the second top segment and within the guidance slot, wherein the guidance pin and guidance slot facilitate the relative movement of the overlapping portions of the first and second top segments.

BRIEF DESCRIPTION OF THE DRAWINGS

FIG. 6 is an orthogonal view of the present invention located in a corner.

DESCRIPTION OF THE PREFERRED EMBODIMENTS

Figure 1:
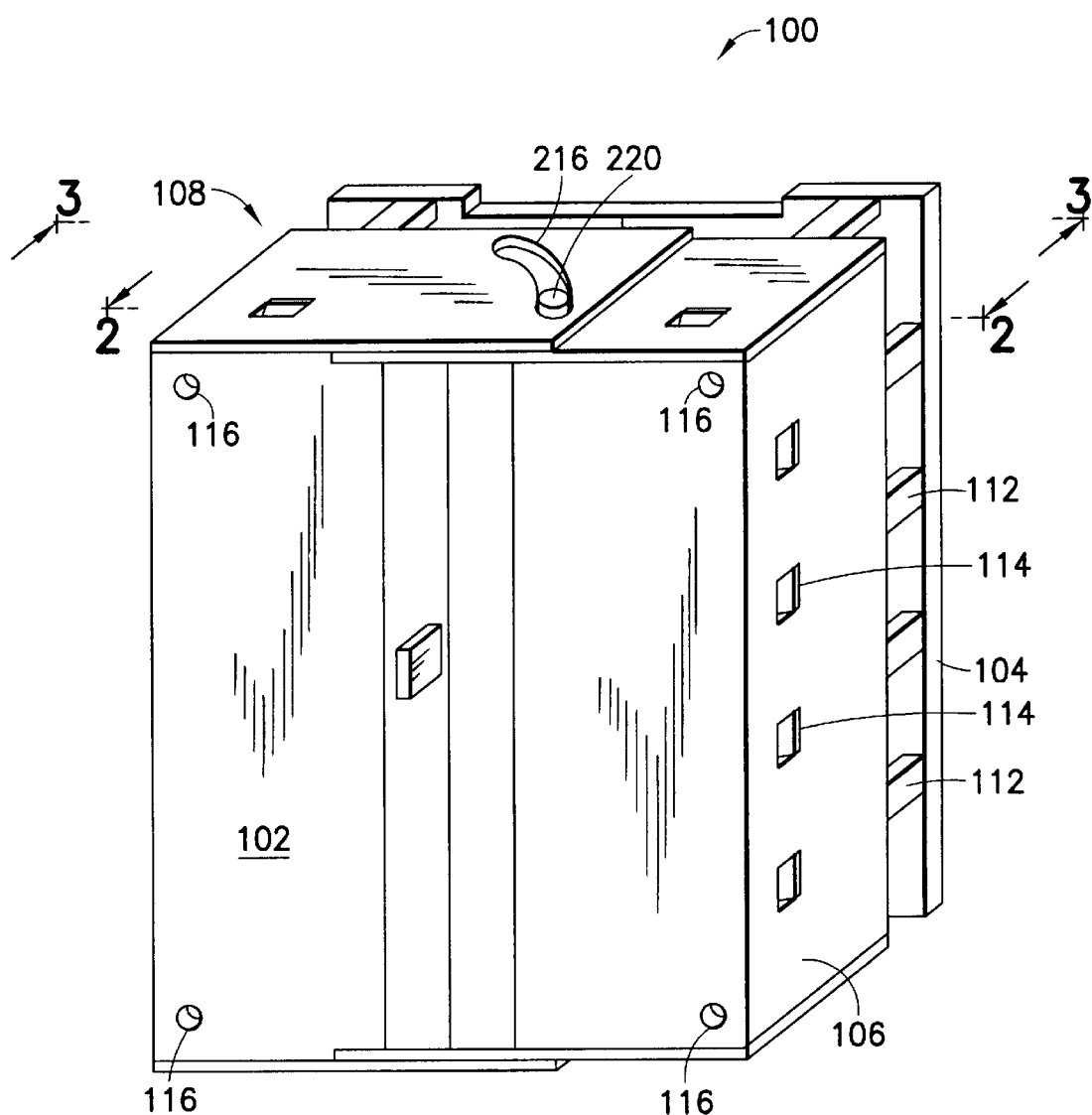
FIG. 1 is an orthogonal view of a preferred embodiment of the present invention.

Turning now to FIG. 1, an orthogonal view of the conformable termite bait container 100 present invention is shown.

Conformable termite bait container 100 preferably comprises a housing having front wall 102, back wall 104, a plurality of side walls 106, top 108 and bottom 110.

In the preferred embodiment, front wall 102 is operatively connected to back wall 104 via a plurality of legs 112, a terminal portion of each engaging one of a plurality of slots 114 located within side walls 106, top 108 and bottom 110.

Figure 4:
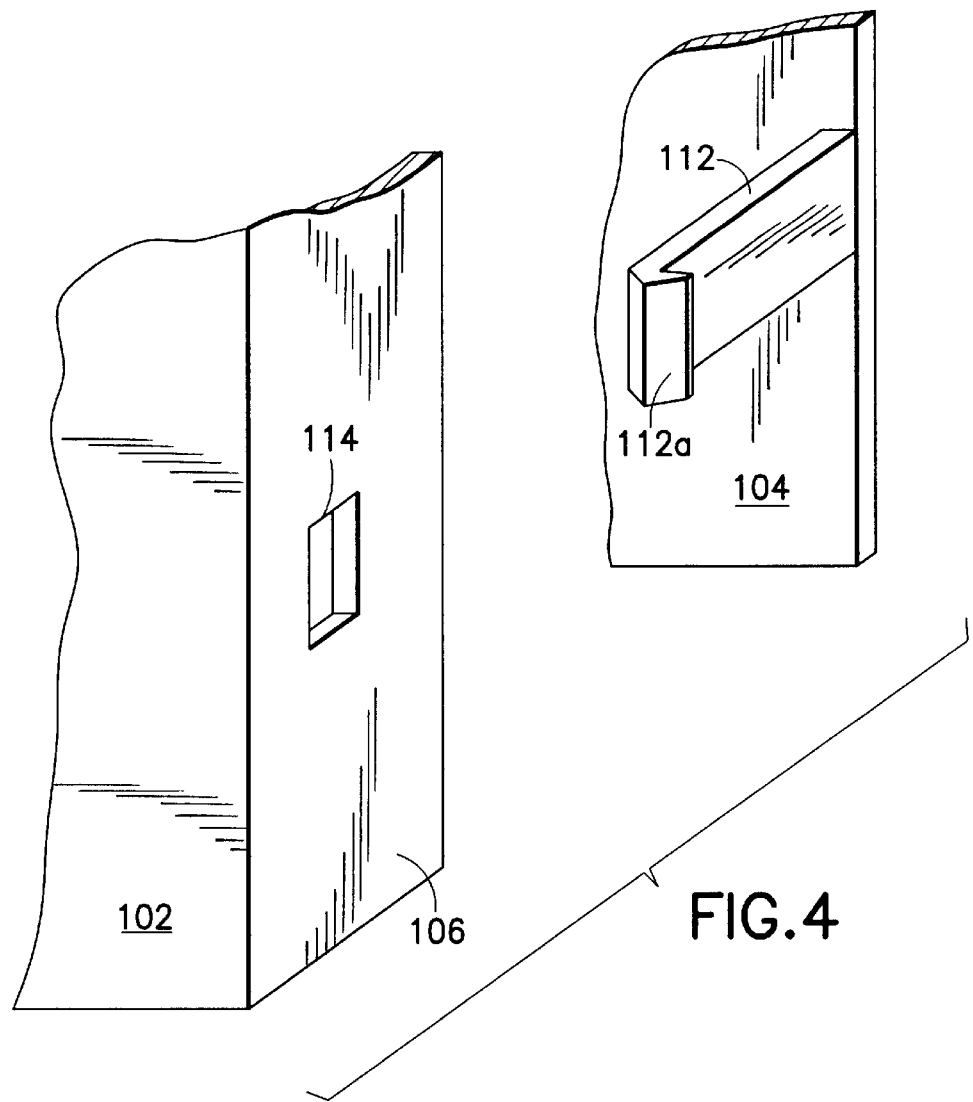
FIG. 4 is an isolated exploded isometric view of the preferred method of operatively connecting the front and back walls of the preferred embodiment shown in FIG. 1.

With reference to FIG. 4, an isolated exploded isometric view showing one leg 112 and one slot 114 is illustrated. In the preferred embodiment, one terminal end of leg 112 is secured to a terminal edge of back wall 104, while the other terminal end, having beveled protrusion 112a, is engagably securable within slot 114. Protrusion 112a is preferably beveled to assist the assembly of legs 112 within slots 114.

Returning to FIG. 1, termite bait (not shown) is locatable within the cavity formed by the front, back and side walls and the top and bottom. The termite bait is well known in the art, and preferably comprises a plurality of cardboard sheets impregnated with suitable poison.

In the preferred embodiment, the side walls, top and bottom are dimensioned to provide a gap between their respective terminal ends and the back wall, thereby allowing termites to enter and exit the cavity of the housing to access the bait. Alternatively, the side walls, top and bottom may substantially contact the back wall, with holes or other openings located therewithin to provide access.

In use, termite bait container 100 may be placed against a flat surface, such as a wall, in an area of termite infestation. Screws (not shown) may be driven through holes 116, thereby securing back wall 104 of the termite bait container thereto. Alternatively, two-sided tape, glue or other suitable adhesive may be used to secure the back wall of the termite bait container thereto.

Alternatively, the termite bait container may be placed in a corner by suitably bending front wall 102 and back wall 104 to conform thereto.

Figure 2:
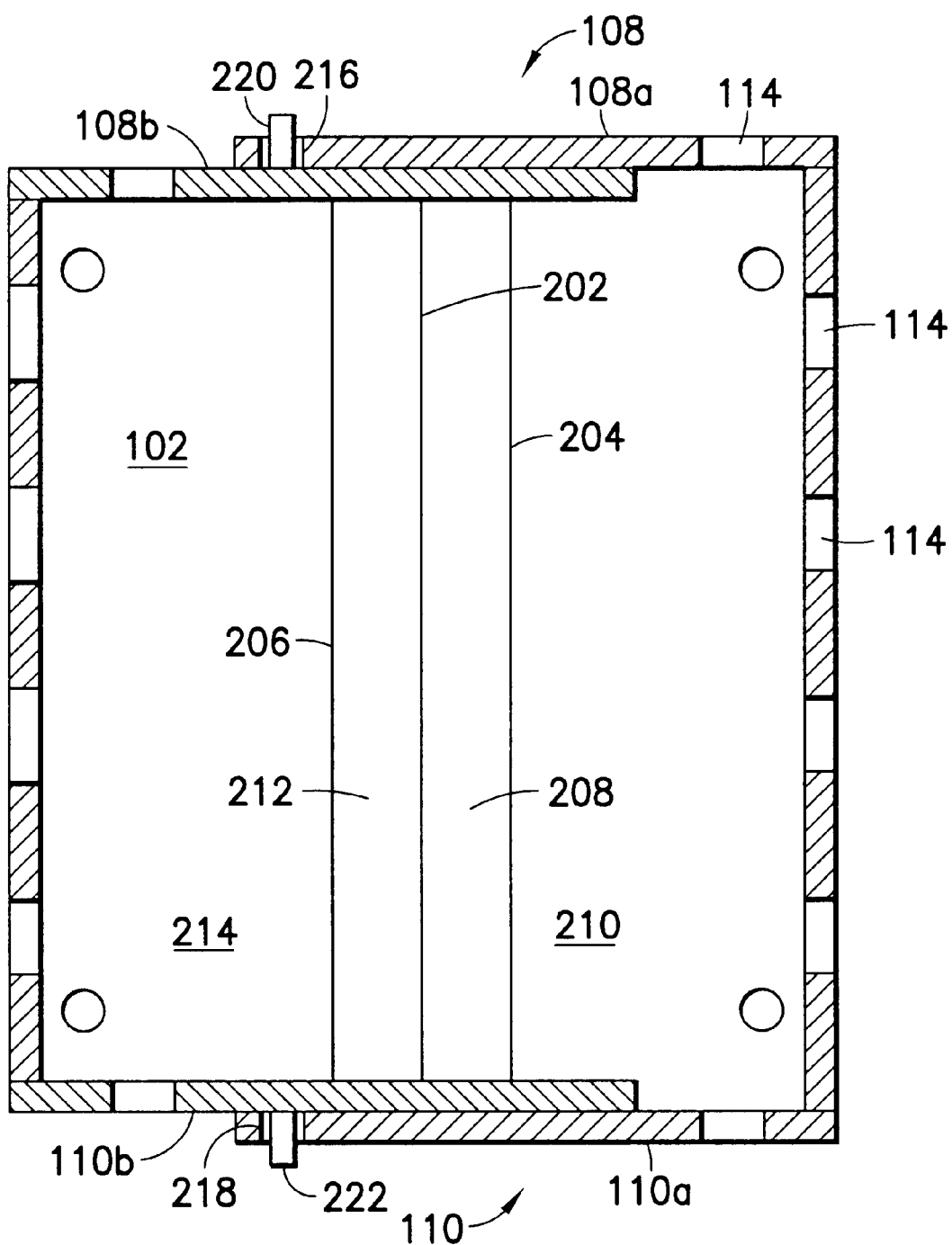
FIG. 2 is a cross-sectional front view of the preferred embodiment shown in FIG. 1, taken at section lines 2—2 of FIG. 1.
Figure 3:
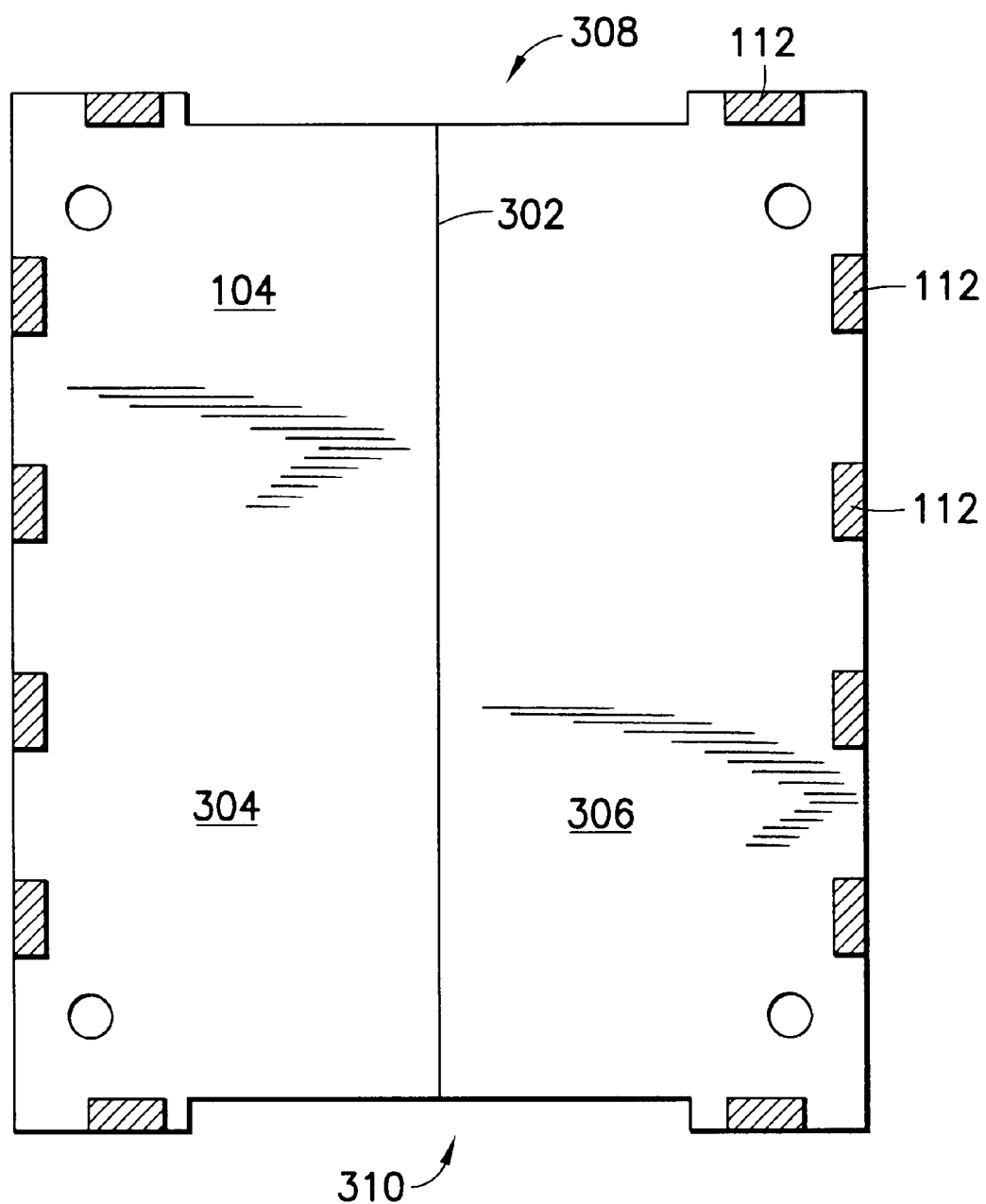
FIG. 3 is a cross-sectional back view of the preferred embodiment shown in FIG. 1, taken at section lines 3—3 of FIG. 1.

Turning now to FIGS. 2 and 3, cross-sectional front and rear views of the termite bait container shown in FIG. 1, taken at section lines 2—2 and lines 3—3, respectively, are illustrated.

With reference to FIG. 2, front wall 102 preferably comprises a front hinge including three structurally-weakened areas 202, 204 and 206, each of which are located along the longitudinal length of the front wall, divide it into first inner portion 208, first outer portion 210, second inner portion 212 and second outer portion 214.

With reference to FIG. 3, back wall 104 preferably comprises a back hinge including structurally-weakened area 302 located along its longitudinal length, dividing the back wall into first back portion 304 and second back portion 306.

Structurally-weakened areas 202–206 and 302 facilitate the bending of the front and back walls, respectively, by degrading the structural integrity thereof, and preferably comprise a V-shaped channel cut into the walls. Alternatively, structurally-weakened areas 202–206 and 302 may comprise an indent, a plurality of perforations, a groove or other suitable configuration to weaken the structural integrity of the front and back walls.

Figure 5:
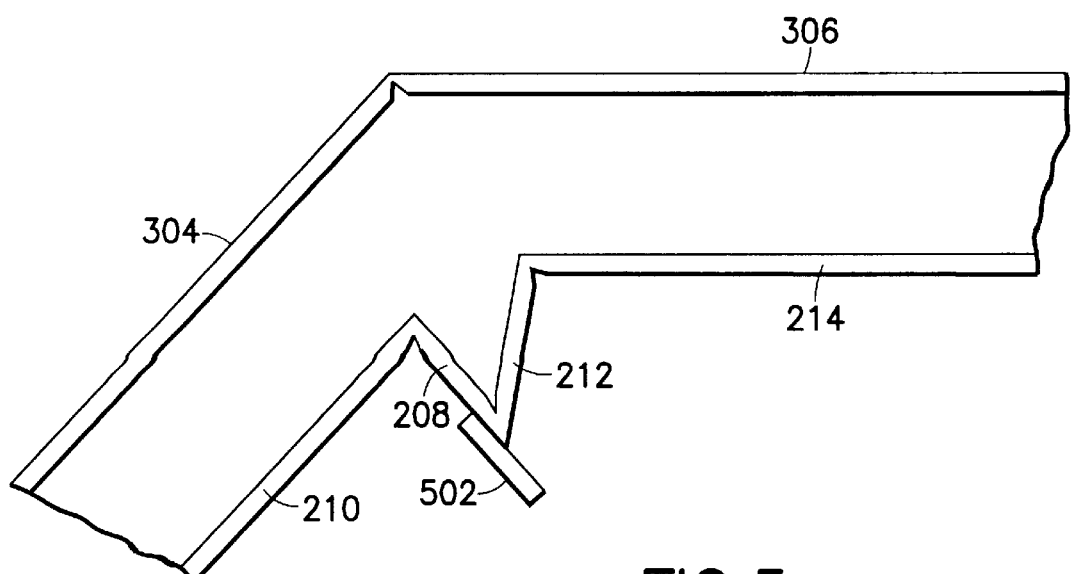
FIG. 5 is a cut-away top view of the preferred embodiment shown in FIG. 1, shown during the transitional state of bending the present invention to conform to the shape of a corner.

In use, pressure is preferably applied to the back wall of the termite bait container. With reference to FIG. 5, this pressure causes first and second back portions 304 and 306, respectively, to bend about the pivot axis formed by structurally-weakened area 302.

The bending of the back wall causes first and second inner portions 208 and 212, respectively, to bend about the pivot axis formed by structurally weakened area 202, first inner and first outer portions 208 and 210, respectively, to bend about the pivot axis formed by structurally weakened area 204, and second inner and second outer portions 212 and 214, respectively, to bend about the pivot axis formed by structurally weakened area 206.

In the preferred embodiment, pull tab 502 is preferably attached to first inner portion 208 of the front wall to assist with the bending of the front wall. Specifically, by pulling tab 502 away from the back wall during the initial bending process, first and second inner portions 208 and 212, respectively, move outward, relative to the back wall, allowing the portions of the front wall to bend as described above.

FIG. 6 illustrates the termite bait container in its bent configuration, located in a corner.

Returning to FIG. 2, top 108 preferably comprises first top segment 108a, a portion of which overlaps second top segment 108b. Similarly, bottom 110 preferably comprises first bottom segment 110a, a portion of which overlaps second bottom segment 110b.

During the bending process, first top and first bottom segments 108a, and 110a, respectively, translocate over second top and second bottom segments 108b and 110b, respectively.

To facilitate the relative movement of the overlapping portions of the first and second top segments and first and second bottom segments, guidance slots 216 and 218 are preferably located in first top and first bottom segments 108a and 110a, respectively.

Additionally, guidance pins 220 and 222 are preferably located on second top and second bottom segments 108b and 110b, respectively, and within guidance slots 216 and 218, respectively.

As a portion of the top and bottom segments translocate behind the back wall, relative to the front wall, back wall 104 preferably includes notched areas 308 and 310 (FIG. 3) to accommodate same during the bending process.

Further, as first and second inner portions 208 and 212, respectively, of the front wall move away from portions of top and bottom 108 and 110, respectively, during the bending process, the first and second inner portions of the front wall are preferably not attached to any portion of the top and bottom.

In the preferred embodiment, front wall 102 and side walls 106 are manufactured as a single unit from molded or extruded plastic approximately 1.5 mils thick, with their respective slots 114 integral therewith. Additionally, back wall 104 and legs 112 are preferably manufactured as a single unit from molded or extruded plastic approximately 1.5 mils thick.

The approximate overall dimensions of the front and side wall assembly is preferably 4 inches high×4 inches wide×1 inch deep.

There are preferably four legs per side, and two legs each on the top and bottom, each leg 112 preferably having the approximate dimensions of 1 inch high×3/8 inch wide×1.5 mils thick.

The two top segments and two bottom segments are preferably manufactured from molded or extruded plastic approximately 1.5 mils thick, with their respective guidance pins and guidance slots integral therewith, and secured to their respective portions of the front wall via suitable plastic cement.

Structurally-weakened area 302 (on the back wall) is preferably located in the center of the back wall, with structurally-weakened area 202 (on the front wall) preferably located substantially thereover. Structurally-weakened areas 204 and 206 (on the front wall) are preferably offset from structurally-weakened area 202 approximately 3/8 inches.

The termite bait, which preferably comprises a plurality of cardboard sheets impregnated with poison, is preferably structurally weakened along its central longitudinal axis to facilitate its bending together with the bending of the termite bait container of the present invention. Structural weakening can be achieved by scoring, pre-bending or other suitable means.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A conformable termite bait container capable of being located either against a first substantially planar surface or against a corner defined by the intersection of a second and a third substantially planar surfaces, said conformable termite bait container comprising:

a housing defining an interior cavity capable of storing termite bait, the housing including a back wall having a longitudinal length, width and depth, the back wall capable of being located against the first substantially planar surface;

a plurality of openings located on the housing to allow termites to enter and exit the housing and access the termite bait located therewithin;

a first pivot axis located along the longitudinal length of the back wall, the first pivot axis dividing the back wall into a first back portion and a second back portion, wherein the back wall is capable of being bent about the first pivot axis such that the first back portion and second back portion are capable of being located against the second and the third substantially planar surfaces, respectively, defining the corner.

2. The conformable termite bait container of claim 1 further comprising:

a structurally-weakened area located on the back wall substantially in juxtaposition with the first pivot axis, the structurally-weakened area to facilitate the bending of the first back portion and second back portion about the first pivot axis.

3. The conformable termite bait container of claim 2 wherein the structurally-weakened area consists of an indent, a plurality of perforations, a groove and/or a channel.

4. The conformable termite bait container of claim 1, the housing further comprising:

a front wall having a longitudinal length, width and depth, the front wall located substantially parallel to the back wall;

side walls operatively connected between the front wall and the back wall;

a second pivot axis located along the longitudinal length of the front wall and substantially opposed to the first pivot axis, the second pivot axis dividing the front wall into a first front portion and a second front portion;

a third pivot axis located along the longitudinal length of the first front portion, the third pivot axis dividing the first front portion into a first inner portion, located between the second and third pivot axes, and a first outer portion;

a fourth pivot axis located along the longitudinal length of the second front portion, the fourth pivot axis dividing the second front portion into a second inner portion, located between the second and fourth pivot axes, and a second outer portion;

wherein the bending of the back wall about the first pivot axis results in the bending of the first inner portion and second inner portion about the second pivot axis, the bending of the first outer portion and first inner portion about the third pivot axis, and the bending of the second outer portion and second inner portion about the fourth pivot axis, such that the first and second outer portions of the front wall are substantially parallel to the first and second back portions of the back wall, respectively.

5. The conformable termite bait container of claim 4 further comprising:

a first, a second and a third structurally-weakened area located on the front wall substantially in juxtaposition with the second, the third and the fourth pivot axes, respectively, the first, second and third structurally-weakened areas to facilitate the bending of the first inner portion and second inner portion about the second pivot axis, the bending of the first outer portion and first inner portion about the third pivot axis, and the bending of the second outer portion and second inner portion about the fourth pivot axis, respectively.

6. The conformable termite bait container of claim 5 wherein the first, second and third structurally-weakened areas each consist of an indent, a plurality of perforations, a groove and/or a channel.

7. The conformable termite bait container of claim 4 further comprising:

a pull tab located on the front wall substantially in juxtaposition with the second pivot axis, the pull tab capable of having a force exerted thereon to force the first and second inner portions of the front wall to move away from the back wall, thereby facilitating the bending of the first and second inner portions of the front wall about the second pivot axis.

8. The conformable termite bait container of claim 4, wherein the back wall and front wall each comprise a plurality of terminal ends, two opposite ends of which are defined as top and bottom, respectively, and wherein the container further comprises:
   a first top segment operatively connected to the top of the first outer portion of the front wall and a second top segment operatively connected to the top of the second outer portion of the front wall, wherein a portion of first top segment overlaps a portion of the second top segment, and wherein the first and second top segments are positioned substantially perpendicular to the front wall, wherein the bending of the back wall about the first pivot axis results in the translocation of the first top segment, relative to the second top segment.

9. The conformable termite bait container of claim 8 further comprising:
   a guidance slot located in the first top segment; and
   a guidance pin located on the second top segment and within the guidance slot, wherein the guidance pin and guidance slot facilitate the relative movement of the overlapping portions of the first and second top segments.

10. The conformable termite bait container of claim 4, wherein the back wall and front wall each comprise a plurality of terminal ends, two opposite ends of which are defined as top and bottom, respectively, and wherein the container further comprises:
   a first bottom segment operatively connected to the bottom of the first outer portion of the front wall and a second bottom segment operatively connected to the bottom of the second outer portion of the front wall, wherein a portion of first bottom segment overlaps a portion of the second bottom segment, and wherein the first and second bottom segments are positioned substantially perpendicular to the front wall, wherein the bending of the back wall about the first pivot axis results in the translocation of the first top and bottom segments, relative to the second top and bottom segments, respectively.

11. A conformable termite bait container capable of being located either against a first substantially planar surface or against a corner defined by the intersection of a second and a third substantially planar surfaces, said conformable termite bait container comprising:
   a housing having a front wall, a back wall and side walls operatively connected between the front wall and the back wall, the front, back and side walls forming an interior cavity capable of storing insect bait; and
   a plurality of openings located on the housing to allow termites to enter and exit the housing and access the insect bait located therewithin;
   wherein the back wall of the housing is capable of being located against the first substantially planar surface, and in the alternative, the back wall and front wall are capable of being bent substantially in the shape of the corner to allow a first and a second portion of the back wall to be located against the second and the third substantially planar surfaces, respectively, defining the corner.

12. The conformable termite bait container of claim 11, further comprising:
   a back hinge located on the back wall to facilitate the bending of the back wall; and
   a front hinge located on the front wall to facilitate the bending of the front wall.

13. The conformable termite bait container of claim 12, wherein the back hinge comprises a structurally-weakened area defining a pivot axis, the structurally-weakened area operatively dividing the back wall into the first portion and the second portion, wherein the first and second portions of the back wall are capable of being bent about the pivot axis, thereby allowing the first and the second portions of the back wall to be located against the second and the third substantially planar surfaces, respectively, defining the corner.

14. The conformable termite bait container of claim 13, wherein the structurally-weakened area consists of an indent, a plurality of perforations, a groove and/or a channel.

15. The conformable termite bait container of claim 12, wherein the front hinge comprises:
   a first structurally-weakened area located on the front wall and defining a first pivot axis, the first structurally-weakened area operatively dividing the front wall into a first front portion and a second front portion;
   a second structurally-weakened area located on the first front portion and defining a second pivot axis, the second structurally-weakened area operatively dividing the first front portion into a first inner portion, located between the first and second pivot axes, and a first outer portion;
   a third structurally-weakened area located on the second front portion and defining a third pivot axis, the third structurally-weakened area operatively dividing the second front portion into a second inner portion, located between the first and third pivot axes, and a second outer portion;
   wherein the bending of the back wall results in the bending of the first inner portion and second inner portion about the first pivot axis, the bending of the first outer portion and first inner portion about the second pivot axis, and the bending of the second outer portion and second inner portion about the third pivot axis.

16. The conformable termite bait container of claim 15, wherein the first, second and third structurally-weakened areas consist of an indent, a plurality of perforations, a groove and/or a channel.

17. The conformable termite bait container of claim 15 further comprising:
   a pull tab located on the front wall substantially in juxtaposition with the first pivot axis, the pull tab capable of having a force exerted thereon to force the first and second inner portions of the front wall to move away from the back wall, thereby facilitating the bending of the first and second inner portions of the front wall about the first pivot axis.

18. The conformable termite bait container of claim 11, wherein the back wall and front wall each comprise a plurality of terminal ends, two opposite ends of which are defined as top and bottom, respectively, and wherein the container further comprises:
   a first top segment operatively connected to the top of a first portion of the front wall and a second top segment operatively connected to the top of a second portion of the front wall, wherein a portion of first top segment overlaps a portion of the second top segment, and wherein the first and second top segments are positioned substantially perpendicular to the front wall, wherein the bending of the back wall results in the translocation of the first top segment, relative to the second top segment.

19. The conformable termite bait container of claim 18 further comprising:

a guidance slot located in the first top segment; and a guidance pin located on the second top segment and within the guidance slot, wherein the guidance pin and guidance slot facilitate the relative movement of the overlapping portions of the first and second top segments.

20. The conformable termite bait container of claim 11, wherein the back wall and front wall each comprise a plurality of terminal ends, two opposite ends of which are defined as top and bottom, respectively, and wherein the container further comprises:

a first bottom segment operatively connected to the bottom of a first portion of the front wall and a second bottom segment operatively connected to the bottom of a second portion of the front wall, wherein a portion of first bottom segment overlaps a portion of the second bottom segment, and wherein the first and second bottom segments are positioned substantially perpendicular to the front wall, wherein the bending of the back wall results in the translocation of the first bottom segment, relative to the second bottom segments.

21. A conformable termite bait container capable of being located either against a first substantially planar surface or against a corner defined by the intersection of a second and a third substantially planar surfaces, said conformable termite bait container comprising:

a housing having a front wall, a back wall and side walls operatively connected between the front wall and the back wall, the front, back and side walls forming an interior cavity;

termite bait located within the cavity of the housing;

a plurality of openings located on the housing to allow termites to enter and exit the housing and access the termite bait;

a back hinge located on the back wall to facilitate the bending of the back wall; and a front hinge located on the front wall to facilitate the bending of the front wall;

wherein the back wall of the housing is capable of being located against the first substantially planar surface, and in the alternative, the back wall and front wall are capable of being bent about the back hinge and front hinge, respectively, substantially in the shape of the corner to allow a first and a second portion of the back wall to be located against the second and the third substantially planar surfaces, respectively, defining the corner.

22. The conformable termite bait container of claim 21 wherein the termite bait comprises a plurality of termite-ingestible sheets having poison integral therewith, the sheets capable of being bent to substantially conform to the back wall.

23. The conformable termite bait container of claim 21 wherein the termite bait comprises a plurality of termite-ingestible segments having poison integral therewith.

* * * * *